Feb. 7, 1961

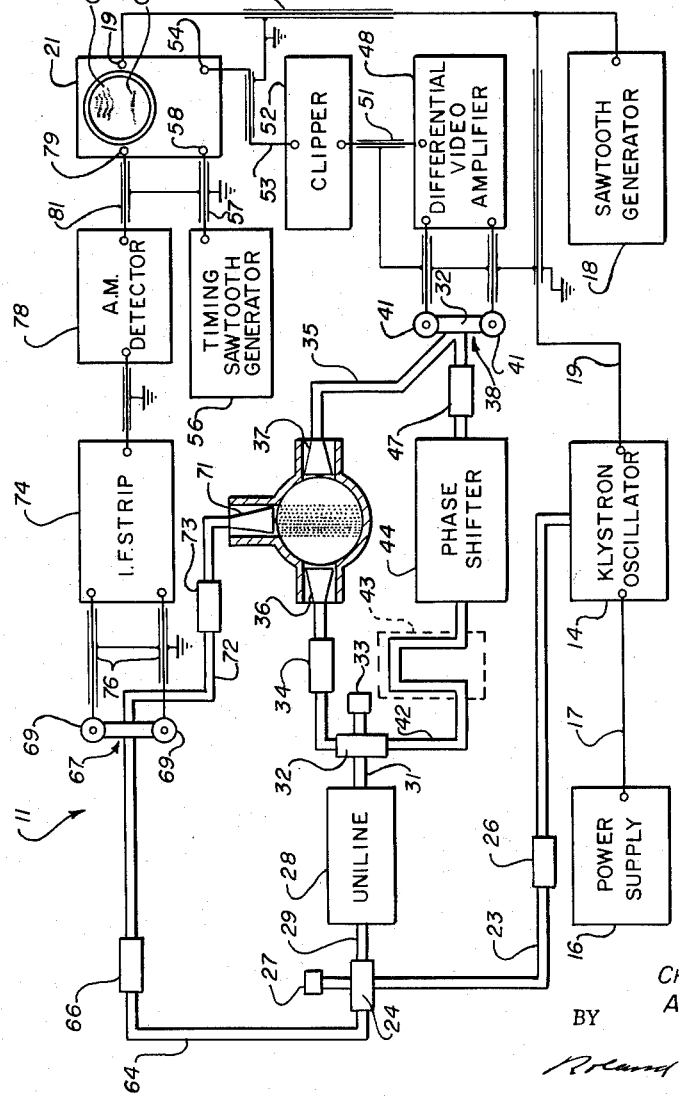

C. B. WHARTON ET AL 2,971,153

MICROWAVE HORNS AND CIRCUITRY FOR
PLASMA MEASUREMENTS

Filed May 28, 1959

INVENTORS.
CHARLES B. WHARTON
ANDREW L. GARDNER
BY

*Roland A. Anderson*

ATTORNEY

United States Patent Office 2,971,153
Patented Feb. 7, 1961

2,971,153
MICROWAVE HORNS AND CIRCUITRY FOR PLASMA MEASUREMENTS

Charles B. Wharton, Pleasanton, and Andrew L. Gardner, Livermore, Calif., assignors to the United States of America as represented by the United States Atomic Energy Commission Filed May 28, 1959, Ser. No. 816,656

7 Claims. (Cl. 324—58.5)

The present invention relates generally to the measurement of the characteristics of a plasma of ions and electrons, and more particularly to microwave apparatus for measuring plasma characteristics.

With the increasing use of plasmas in the fields of atomic energy and electronics, it has been of increasingly great importance to devise convenient and reliable ways and means of measuring the characteristics of plasmas, such as density, temperature and physical boundaries. Formerly this was undertaken by means of a probe and by the use of reflected light waves. Since the probe introduces considerable disturbance into the gaseous discharge areas and since reflections are greatly affected by boundary conditions, these methods both have quite severe limitations in their utility.

The present invention by providing means for the measurement of the phase change which takes place in an electromagnetic wave of short wave lengths in passing through the plasma, largely eliminates these difficulties. The electromagnetic wave having small energy content creates very little disturbance in the gas discharge, also the effects of boundary conditions are greatly minimized as compared to measurements made by means of light reflections.

Therefore it is an object of the present invention to introduce electromagnetic waves into a plasma cavity and to remove said waves therefrom.

It is another object of this invention to pass microwaves through a plasma.

Another object of the invention is to measure the amount of delay experienced by electromagnetic waves in passing through a plasma, by comparison with a sample of the same electromagnetic waves which do not pass through a plasma.

An important objective of this invention is the determination of the density and distribution of a plasma from measured delays experienced by microwaves in passing through said plasma.

A further object of this invention is the measurement of plasma temperatures by observation of a band of electromagnetic frequencies radiated therefrom.

The following description of the present invention will make other objects and advantages obvious to those skilled in the art, when said description is considered in relation to the accompanying drawing, of which:

Figure 1 is a block diagram of a preferred circuit in accordance with the present invention for accomplishing plasma density and noise measurements;

Figure 2 is an elevation view of the viewing area of the cathode ray tube;

Figure 3:
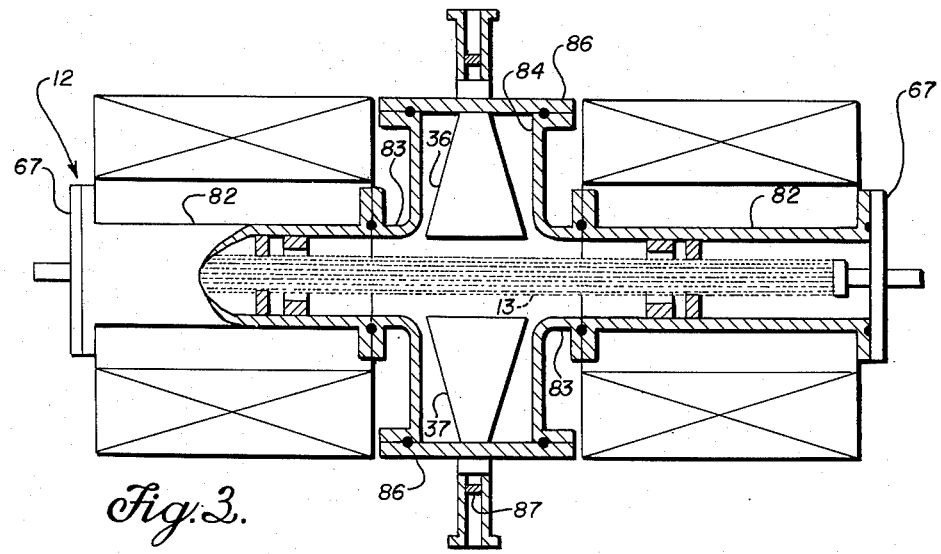
Figure 4:
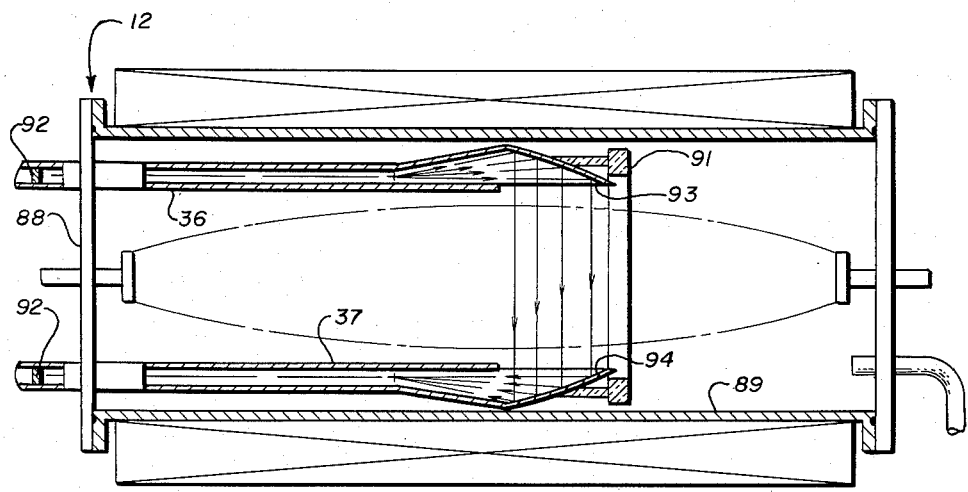

Figure 3 is a cross sectional view of waveguide horns and conforming structure in accordance with the invention as designed to introduce and extract microwave energy transversely to and from a chamber for generating or containing a plasma; and Figure 4 is a detail view of an alternate design of waveguide horns and conforming structure in accordance with the invention providing axial entry and egress through one end of the plasma containing chamber for the introduction and extraction of microwave energy transversely to and from the plasma containing space.

Referring now to the circuit block diagram pictured in Figure 1, there is provided a measuring circuit 11 in accordance with the present invention for measuring the properties of a gaseous plasma within a plasma containing chamber 12. This plasma containing chamber 12, for example, may be a plasma generator or source, Phillips Ion Gauge, a gas discharge tube, a thermonuclear reactor, or the like, or may possibly be a ballistic tunnel for the study of plasma caused by high velocity projectiles. The plasma within chamber 12 is indicated generally at 13.

Measurement circuit 11 preferably includes a klystron oscillator 14 or equivalent source of high frequency or microwave energy having a frequency, for example, in the order of 25 thousand megacycles per second. The necessary power to operate the klystron oscillator 14 is provided by means of a power supply 16 through connecting wires 17. The frequency output of oscillator 14 is modulated by a sawtooth signal produced by a sawtooth generator 18 coupled to the repeller electrode of oscillator 14 as by means of a coaxial cable 19. The frequency sweep of oscillator 14 may in this manner be controlled over a range of 50 megacycles, for instance, or 25 megacycles either side of the center frequency of the oscillator 14, as described in Terman's "Electronic and Radio Engineering" and as is known in the art. The sawtooth-shaped voltage output from generator 18 is also applied to the upper beam vertical deflection terminal 19 of a dual beam oscilloscope 21 by means of a coaxial cable 22. The sawtooth voltage of generator 18 thus controls the vertical deflection of the upper beam of oscilloscope 21, indicated generally as channel B.

The frequency modulated output of oscillator 14 is connected as by means of a waveguide 23 to one side arm of a magic "T" 24. A pad 26 is included in the waveguide for the purpose of properly loading the output of oscillator 14 and preventing reflection from magic "T" 24. The opposite side arm of the magic "T" 24 is connected to a suitable terminating impedance 27. The input frequency modulated microwave energy is hence divided between the series and parallel arms of the "T" and available thereat for application to two separate branches of the circuit. In accordance with the present invention, the microwave energy at, for example, the series arm is applied to a branch of the circuit for plasma density measurements while the energy at the parallel arm is applied to a branch of the circuit for plasma noise or temperature measurements.

As regards the density measurement branch of the circuit, it will be noted that same includes a uniline element 28 coupled to the series arm of magic "T" 24 as by means of a waveguide 29. Uniline element 28 functions in a well known manner to pass microwave energy freely in a direction away from magic "T" 24 but blocks the passage of energy in the opposite direction. Several devices for accomplishing the foregoing are available commercially.

Uniline element 28 is in turn coupled by another waveguide 31 to a second magic "T" 32 which is employed to split the microwave energy in the density measurement branch of the circuit into two portions for application to two alternate paths therein. More particularly, waveguide 31 is coupled to one side arm of magic "T" 32 and the opposite side arm thereof is terminated in a matching impedance 33 which serves to balance energy conditions at the "T" and eliminate reflections of microwave energy therein. From magic "T" 32 at, for example, the series arm thereof the first portion of the microwave energy is coupled by means of waveguide 30 including a pad 34 to a microwave horn 36 mounted within plasma chamber 12 with the open end adjacent to plasma column 13. Microwave energy radiated from horn 36 passes through the plasma column 13 and is picked up by a second microwave horn 37 also mounted within source 12. The energy received by horn 37 is coupled by a waveguide 35 to a phase comparator 38 which preferably comprises a magic "T" 39 having two silicon diodes 41 connected in opposite side arms thereof, the waveguide 35 from horn 37 being connected to, for example, the series arm of the "T" 39. A second portion of the microwave energy from magic "T" 32 is transmitted via, for example, the parallel arm thereof and a waveguide 42 to a long delay line 43 and phase shifter 44 and thence to a waveguide 46 including a variable pad 47 and then to phase comparator 38 by connection of waveguide 46 to the parallel arm of magic "T" 39. Hence the microwave energy is applied from magic "T" 32 to two altermnate wave paths which are combined at phase comparator 38. As is well known, the characteristics of the phase comparator magic "T" 39 are such that when microwaves enter the parallel and series arms of the "T", the outputs are subtracted vectorially in one side arm and added vectorially in the other. The outputs from diodes 41 of phase comparator 38 are hence the rectified vector sum and difference of the two signals applied thereto via the two alternate paths and form the signal inputs to a differential video amplifier 48 connected to the diodes as by means of coaxial cables 49 which connect to the two sides of a push-pull stage of amplification in said differential video amplifier 48. Such resultant phase difference signal is coupled via another section of coaxial cable 51 to a clipper 52 which removes maximum peaks and thus removes amplitude variation effects in the output signal as derived from amplifier 48. Another length of coaxial cable 53 couples the output of clipper 52 to terminal 54 of dual beam oscilloscope 21. This terminal 54 is connected to the intensity lead of the upper trace or channel B of oscilloscope 21 in such manner that the trace is visible when the clipped peak voltages from clipper 52 are received. However when the voltage drops a little below this clipped peak value the trace is blanked out. A timing sawtooth generator 56 is connected by means of a coaxial cable 57 to terminal 58 of said dual beam oscilloscope and through this terminal 58 the horizontal sweeps of both channels A and B are controlled.

Sawtooth generator 18 controlling the vertical sweep of channel B through connection to terminal 19 makes many sweeps, 100 for instance, during one sweep of the timing sawtooth generator 56. This combination of sweeps on channel B forms a raster similar to that used for television pictures. Since the same sawtooth signal from generator 18 which causes a vertical sweep of the channel B cathode ray spot also controls the frequency sweep of klystron oscillator 14, it may readily be seen that a single vertical trace of channel B will represent one sweep of the oscillator frequency. When an electrical wave is divided between two paths of equal electrical length it is evident that the waves in the two paths will be in phase at the output. A delay of one wave length in one path will still leave the output waves in phase. Now assuming the first frequency a maximum, to be changed to a new frequency, a minimum, and the outputs of the two branches compared again, the two output waves may be brought into phase by increasing the time delay to the new electrical wavelength. Now to make the two outputs come out in phase when either the maximum or minimum frequencies are used the time delay path will have to be increased to the minimum length into which both wavelengths may be evenly divided. For instance if one wavelength were 4 mm. and the other 5 mm. a delay of 20 mm. would be required for the two to be in phase. It is further evident that a difference of phase of 360° or one complete cycle or more is introduced by such a time delay between the maximum and minimum frequencies. Now comparing the output starting at the maximum frequency, the two output waves are in phase adding vectorially to a maxima. As the frequency is reduced toward the minimum frequency the phase relations pass through at least one complete 360° cycle passing through phase opposition where the two waves add to zero total output one or more times and the two waves are finally in phase as the minimum frequency is reached producing a final voltage addition or maxima. Now if this time delay for a complete cycle of change is increased by an even ten times, the output will pass through ten times the above number of complete cycles as the frequency changes from maximum to minimum, viz., ten minima and maxima of the vectorially added voltages are obtained.

The time delay introduced by delay line 43 is such that the vector addition of the voltages reaching the differential video amplifier 48 by the two paths 49 will go through a number of maxima and minima conditions as described above, preferably about twelve or more of these cycles being employed and representing twelve or more complete cycles of the incoming wave.

As the oscillator 14 makes one frequency sweep and the channel B trace makes a simultaneous vertical sweep, the cathode ray spot will be turned on several times as signal maxima sufficient to activate the cathode ray spot are encountered and turned off between these maxima. This will be depicted on the screen of the cathode ray tube 59 as depicted in Figure 2 as several short dashes at lines 60, 61, 62, and 63 with blank spaces occurring between them. By making use of a cathode ray tube of the correct persistence rating this image may be held during the formation of a complete raster, which will develop as this group of short dashes is repeated many times during the horizontal sweep. With no plasma in the chamber 12 of Figure 1 these images will appear as several straight horizontal lines each composed of many short vertical lines placed side by side which have been called fringes. These fringe lines represent maxima conditions and the change from one fringe to the next represents a phase shift of 360°. However, when plasma 13 enters the chamber 12 during the formation of a raster the lines will no longer be straight horizontal lines but will curve as the plasma density varies.

Since the space from one line to the next on the channel B oscilloscope display indicates a phase shift of 360° in the microwave, the phase shift of the electrical wave in traversing the plasma may be read on the oscilloscope as a factor of this said space. This factor multiplied by 360° will indicate the phase shift in degrees which may readily be converted to radians.

Plasma densities may readily be determined from the observed phase shift. Assuming first that the horns 38 and 39 are small compared to the volume of the plasma 13 so that there will be little or no change in the total thickness of the plasma to be penetrated at any point across the mouths of said horns, the following equation may be used to relate phase shift in the microwave as it passes through the plasma 13 to density.

Phase coefficient $$\beta = \frac{\omega}{c}\sqrt{1-An(x)} = \frac{\omega}{c}\sqrt{1-An_0 J_0 K\left(\frac{a-x}{a}\right)}$$

radians per meter;

Phase shift $$\beta d = \frac{2\omega}{c}\int_0^a \sqrt{1-An_0 J_0 K\left(\frac{a-x}{a}\right)}\,dx \text{ radians}$$

for plasma in cylindrical chambers which have a spatial density distribution approximated by the $J_0$ Bessel function Where
$a$ = inner radius of chamber 12
$d$ = distance between faces of horns 38 and 39

$x$ = point in space between the two horns, measured parallel to the $x$ axis which connects the centers of the faces of horns 38 and 39 and having the point of origin ($x=0$) at the face of horn 38
$\omega$ = frequency of the microwave in radians per sec.
$c$ = speed of light
$n$ = number of electrons per cubic meter
$n_0 = n$ at the center of chamber 12
$n_x = n$ at point $x$ $$A = \frac{e^2}{m\epsilon_0 \omega^2}$$

$e$ = unit electron charge
$m$ = unit electron mass
$\epsilon_0$ = space capacitance for conditions of vacuum =

$$\left(\frac{1}{36\pi}\right) \times 10^{-9} \text{ farad/meter}$$

$$n(x) = n_0 J_0 K\left(\frac{a-x}{a}\right)$$

indicates an electron distributed along the $x$ axis from $x=0$ to $x=a$ and in accordance the zero—order Bessel function.

Since the above integral for the phase shift $\beta d$ is quite difficult to evaluate, an approximation based on a trapezoidal distribution may possible be used in place of the zero—order Bessel function. In the trapazoidal distribution the distribution along the $x$ axis starting from $x=0$ is as follows:

From $x=0$ to $x=b$; $n_1 = n_0 \frac{x}{b}$ (straight line increase)

From $x=b$ to $x=c$ $n_2 = n_0$ (constant over this distance)

From $x=c$ to $x=d$ $n_3 = n_0\left(1 - \frac{x-c}{d-c}\right)$ (straight line decrease)

$$= n_0\left(1 - \frac{x}{b}\right)$$

With this assumed electron distribution $$\text{Phase shift } \beta d = \frac{\omega}{c}\int_0^d \sqrt{1 - An(x)}\, dx$$

$$= \frac{\omega}{c}\int_0^b \sqrt{1 - An_0\frac{x}{b}}\, dx + \frac{\omega}{c}\int_b^c \sqrt{1 - An_0}\, dx$$

$$+ \frac{\omega}{c}\int_c^d \sqrt{1 - An_0\left(1 - \frac{x}{b}\right)}\, dx$$

$$= \frac{d\omega}{c}\left\{\frac{1}{3An_0}[1-(1-An_0)^{3/2}]\right.$$

$$\left. + \frac{(1-An_0)^{1/2}}{2}\right\} \text{radians.}$$

An electron density distribtuion to produce the observed phase shift may be derived from this formula.

Details regarding the derivation of these formulas may be obtained from the Lawrence Radiation Laboratory of the University of California Reports UCRL–4477 and UCRL–4836 which cover this problem in some detail.

The pads 34 and 47 permit the adjustment of energy levels to obtain the desired balance of voltages and power level at the phase comparator 41. With waveguide 30 blocked by an inserted piece of metal closing the waveguide opening at any convenient flange connection, and with clipper 52 bypassed, the power level through delay line 43 and phase shifter 44 may be adjusted by pad 47 to a desirable operating range for crystal diodes 41. Then removing restriction from waveguide 31 the power levels in the two branches may be balanced by adjusting pad 34 and phase shifter 44 to obtain a symmetrical pattern on the oscilloscope screen. With the clipper then reinserted sufficient power should now be obtained to get clipper action on several of the higher peaks, preferably about four of these. These four clipped peaks would then be indicated on the oscilloscope screen as the fringes 60, 61, 62 and 63 of Figure 2.

Considering now the noise measurement or plasma temperature measurement portion of the circuit, the parallel arm of magic "T" 24 is coupled as by means of a waveguide 64 including a pad 66 to a balanced mixer 67 which is preferably provided as a magic "T" 68 with diodes 69 connected to the opposite side arms thereof, and waveguide 64 coupled to the parallel arm thereof. To energize the series arm of magic "T" 68 a microwave horn 71 is disposed within plasma chamber 12 adjacent one end of plasma column 13 and coupled to the series arm as by means of a waveguide 72 including an adjustable pad 73. The microwave horn 71 picks up noise energy from plasma 13 and transmits this broad band of energy via waveguide member 72 and adjustable pad 73 to the balanced mixer 67. In the balanced mixer this signal beats with a portion of the klystron oscillator output energy applied to the parallel arm of "T" 68 as obtained from magic "T" 24, through waveguide 64 and pad 66 by which the energy level of this oscillator signal is controlled. The two input signals upon being mixed produce an intermediate frequency at the outputs of diodes 69 which is coupled to an intermediate frequency strip 74 as by a pair of coaxial cables 76 connecting to opposite ends of the primary coil of an input transformer. Following amplification in the I.F. strip 74 at a 30 mc. center frequency for instance with a band 5 mc. wide on each side, the signal passes via another coaxial cable 77 to an A.M. detector 78 where the signal is rectified. This signal is placed on terminal 79 of oscilloscope 21 by means of coaxial cable 81 where it controls the vertical movement of the cathode ray spot forming channel A. The horizontal sweep of this channel A is controlled by the timing generator 56 and has the same sweep as previously mentioned channel B.

The noise signal shown on channel A of oscilloscope 21 is a rectification of two bands of frequency, e.g., 10 mc. wide located at center frequencies of, e.g., 25 kmc.+30 mc. and at 25 kmc.—30 mc. The magnitudes of rectified signals thus obtained are indicated on the oscilloscope 21 channel A by the amount of vertical deflection shown, the horizontal deflection being a time base. The vertical deflection of the trace of channel A is proportional to the temperature of the plasma but not in a straight line relation. In fact the energy radiated as a function of plasma is quite involved and for a treatise on this subject reference is made to the University of California Radiation Laboratory Report UCRL–4836. In the present state of the art it may not always be possible to obtain absolute temperatures. However at least comparative results are possible and may be the most reliable data available.

Considering several preferred arrangements of the microwave horns 36 and 37 and other components in plasma generator 12 for facilitating microwave measurements of plasma density, and referring to Figure 3, the cylindrical glass or non-magnetic metal envelope portions of a Phillips Ion Gauge or other source 12 of plasma requiring measurement is shown at 82. In order to facilitate introduction of the microwave horns 36, 37 and 71 (not shown in Figure 3) into the plasma source, a central member 83 made of stainless steel and adapted for pressure sealed insertion between source envelope portions 82 is provided with three radially extending tubular portions 84, two of which are shown in the figure and the third of which is normal to the plane of the figures to facilitate mounting of horns 36, 37 and 71 respectively. These tubular portions 84 are provided with insulating end caps 86 of Pyrex glass or other suitable insulating material. Microwave horns 36 and 37 as well as 71 are suitably vacuum sealed in end caps 86 and are provided with windows 87 located in the necks of said horns to provide the necessary vacuum seals internal to the horns, said windows readily permitting the microwave energy to pass through.

In this manner the central member 83 facilitates the introduction of microwave horns 36, 37 and 71 into the interior of chamber 12 without interfering with the normal operation of the plasma source, or the introduction and pick-up of microwave energy to and from the interior of chamber 12.

An alternative arrangement for introducing microwave horns into a plasma generating chamber for the purpose of making microwave measurements of plasma quantities and conditions is shown in Figure 4. In this arrangement the microwave horns are introduced into the plasma generating source axially from one end of the source. More specifically, microwave horns 36 and 37 are inserted axially through one end plate 88 which closes envelope portions 89 in vacuum sealed relation thereto and are secured at their distal ends relative to end plate 88 to a Pyrex glass ring 91 to provide mechanical support at the outer ends of the horns. Windows are provided in the necks of said horns 36 and 37 in vacuum sealed relation thereto since otherwise vacuum could not be maintained within chamber 12. The input microwave energy as graphically depicted at the arrows is introduced to one horn 36 passing through the window 92 and striking a parabolically shaped reflecting area 93 provided at the mouth of the horn. The microwave energy is then reflected at right angles to and through the column of plasma 13 as indicated in the figure. After passing through the plasma the microwave is picked up on a similar parabolic reflecting surface 94 of horn 37 and reflected rearwardly to pass through window 92 for reception external to chamber 12.

Although only one embodiment of the invention with illustrations of construction details in two preferred forms has been disclosed herewith, it will be evident to those skilled in the art that other embodiments are possible within the spirit of the invention. Therefore it is not the intention to limit the invention herewith excepting as defined by the following claims.

What is claimed is:

1. A device for indicating the relative phase shift of microwave energy in passing through a contained volume of plasma comprising a microwave oscillator, an oscilloscope having at least horizontal and vertical deflection input terminals and a beam intensity modulation input terminal, a horizontal sweep generator coupled to said horizontal input terminal, a sawtooth generator coupled to said oscillator to repetitiously sweep the microwave output thereof over a fixed range of frequencies and coupled to the vertical deflection input terminal of said oscilloscope, a first path for microwave energy including said contained volume and coupled to the frequency modulated microwave output of said oscillator, a second path for microwave energy coupled to the modulated microwave output of said oscillator and including a time delay element, phase comparison means coupled to said first and second paths for developing a signal indicative of the vector combination of the microwaves received from the two paths, said signal thereby having maxima and minima instantaneously indicative of the relative phase of the microwaves in passing through said two paths, and a clipper coupling said phase comparison means to the beam intensity modulation input terminal of said oscilloscope for clipping tops of the maxima of said signal and removing amplitude variations therefrom whereby a fringe pattern indicative of the relative phase of the microwaves through said two paths with respect to time is displayed upon said oscilloscope.

2. A device for indicating the relative phase shift of microwave energy in passing through a contained volume of plasma comprising a klystron oscillator, a oscilloscope having at least horizontal and vertical deflection input terminals and a beam intensity modulation input terminal, a horizontal sweep generator coupled to said horizontal input terminal, a sawtooth generator coupled to said oscillator to frequency modulate the microwave output thereof and coupled to the vertical deflection input terminal of said oscilloscope, circuit coupling means coupled to the output of said oscillator to split the frequency modulated signal therefrom into two identical component signals, a radiating horn coupled to said circuit coupling means in receiving relation to one of said component signals and disposed within said contained volume to direct microwaves through the plasma, a receiving horn disposed within said contained volume to receive the microwaves subsequent to passage through said plasma, a delay line coupled to said circuit coupling means in receiving relation to the second one of said component signals, a phase shifter connected to said delay line, phase comparison means coupled to said receiving horn and to said phase shifter for vectorially combining the microwaves therefrom to produce a resultant cyclically varying signal having maxima and minima amplitude variations, and a clipper coupling said phase comparison means to the beam intensity modulation input terminal of said oscilloscope for removing amplitude variations from the signal and clipping tops of the maxima thereof at a predetermined level narrowly exceeding the intensity cut-off of the oscilloscope beam.

3. A device as defined by claim 2, further defined by said phase comparison means comprising a magic tee having its series and parallel arms respectively coupled to said receiving horn and to said phase shifter, a pair of diodes respectively connected to the opposite side arms of said magic tee, and a differential video amplifier having first and second inputs respectively connected to said diodes and an output connected to said clipper.

4. A device for indicating the relative phase shift of microwave energy in passing through a contained volume of plasma as defined by claim 2, further defined by a hollow cylindrical member adapted for pressure sealed central attachment to a container for housing said contained volume of plasma and having opposed radially extending side arms with insulating end caps secured thereto, said radiating and receiving horns oppositely disposed within said side arms with the necks of the horns extending through said end caps in pressure sealed relation thereto, and microwave windows pressure sealed wtihin the necks of said horns.

5. A device for indicating the relative phase shift of microwave energy in passing through a contained volume of plasma as defined by claim 2, further defined by an end plate adapted for pressure sealed attachment to an end of a container for housing said contained volume of plasma, said radiating and receiving horns secured to said end plate and extending axially inward therefrom with the necks of the horns extending through the plate in pressure sealed relation thereto, said radiating and receiving horns being provided with parabolic right angle reflecting areas at the mouths thereof, and microwave windows pressure sealed within the necks of said horns.

6. In a device for measuring the characteristics of a plasma, the combination comprising a source of microwave energy, means coupled to said source for repetitiously sweeping the output thereof over a predetermined frequency range, a first path for microwave energy through said plasma and coupled to the swept output of said source, a second path for microwave energy coupled to the swept output of said source and including a time delay element, phase comparison means coupled to said first and second paths for developing a signal proportional to the vector combination of the microwaves received from the two paths, said signal thereby having maxima and minima instantaneously indicative of the relative phase between the microwaves passing through said two paths, a third path for microwave energy coupled to the swept output of said source, means disposed adjacent said plasma for receiving noise energy radiated therefrom and converting same to a proportional broad band noise signal, mixer means coupled to said third path and said last named means for developing an intermediate frequency signal from the swept microwave and noise energy signals, detector means coupled to said mixer means for rectifying said intermediate frequency signal, and indicator means coupled to the output of said phase comparison means and to said detector means for simultaneously displaying the maxima and minima signal and the rectified intermediate frequency signal relative to a common time base as an indication of plasma density and plasma electron temperature in said contained volume with respect to time.

7. A device for measuring the characteristics of a plasma comprising a microwave oscillator, a dual beam oscilloscope having at least first channel horizontal and vertical deflection input terminals and a beam intensity modulation input terminal in addition to second channel horizontal and vertical deflection input terminals, a horizontal sweep generator coupled to said first and second channel horizontal input terminals, a sawtooth generator coupled to said oscillator to repetitiously sweep the microwave output thereof over a fixed range of frequencies and coupled to said first channel vertical deflection input terminal of the oscilloscope, a first path for microwave energy including said contained volume and coupled to the modulated microwave output of said oscillator, a second path for microwave energy coupled to the modulated output of said oscillator and including a time delay element, phase comparison means coupled to said first and second paths for developing a signal indicative of the vector combination of the microwaves received from the two paths, said signals thereby having maxima and minima instantaneously indicative of the relative phase of the microwaves in passing through the two paths, a clipper coupling said phase comparison means to said first channel beam intensity modulation input terminal of the oscilloscope and clipping tops of the maxima of said signal and removing amplitude variations therefrom to produce a fringe pattern on the first channel display of said oscilloscope, a third path for microwave energy coupled to the modulated output of said oscillator, means disposed adjacent said plasma for receiving noise energy therefrom and converting same to a proportional broad band noise signal, mixer means coupled to said third path and said last named means for developing an intermediate frequency signal from the modulated microwave and noise energy signals, and detector means coupling said mixer means to said second channel vertical deflection input terminal of said oscilloscope and rectifying said intermediate frequency signal to produce a noise pattern on the second channel display of said oscilloscope.

References Cited in the file of this patent

UNITED STATES PATENTS 2,602,835    Hershberger _____ July 8, 1952

OTHER REFERENCES

Hershberger et al.: "Thermal and Acoustic Effects Attending Absorption of Microwaves by Gases," RCA Review, September 1946, vol. VII, No. 13, pgs. 422–431.

Birnbaum: "A Recording Microwave Refractometer," The Review of Scientific Instruments—Feb. 1950, vol. 21, No. 2, pgs. 169–176.

Kofoid: "Automatic Measurement of Phase Retardation for Fadome Analysis," The Review of Scientific Instruments, vol. 27, No. 7, July 1956, pages 450–452.

Webber et al.: "Radome Thickness Gage is Frequency Stabilized," Electronics, June 20, 1958, pgs. 70–72.